United States Patent
Tsukioka et al.

(10) Patent No.: US 11,920,621 B2
(45) Date of Patent: Mar. 5, 2024

(54) FASTENING METHOD AND FASTENING DEVICE

(71) Applicant: MITSUBISHI HEAVY INDUSTRIES, LTD., Tokyo (JP)

(72) Inventors: Yuki Tsukioka, Tokyo (JP); Michinobu Takahagi, Tokyo (JP); Akira Ikada, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 374 days.

(21) Appl. No.: 17/432,962

(22) PCT Filed: Jan. 20, 2020

(86) PCT No.: PCT/JP2020/001653
§ 371 (c)(1),
(2) Date: Aug. 23, 2021

(87) PCT Pub. No.: WO2020/174927
PCT Pub. Date: Sep. 3, 2020

(65) Prior Publication Data
US 2022/0042536 A1 Feb. 10, 2022

(30) Foreign Application Priority Data
Feb. 25, 2019 (JP) ................. 2019-031942

(51) Int. Cl.
*F16B 19/05* (2006.01)
*B21D 39/00* (2006.01)
*F16B 5/04* (2006.01)

(52) U.S. Cl.
CPC .............. *F16B 19/05* (2013.01); *B21D 39/00* (2013.01); *F16B 5/04* (2013.01)

(58) Field of Classification Search
CPC . F16B 5/04; F16B 19/05; F16B 19/08; B21D 39/00
USPC .......................................... 411/337, 360–361
See application file for complete search history.

(56) References Cited

U.S. PATENT DOCUMENTS

| 4,197,782 A | * | 4/1980 | Champoux | ............. | F16B 19/05 411/361 |
| 4,755,904 A | * | 7/1988 | Brick | ........................ | F16B 5/04 244/1 A |
| 4,813,834 A | * | 3/1989 | Smith | ..................... | F16B 19/05 411/361 |

(Continued)

FOREIGN PATENT DOCUMENTS

JP  2010509547 A  3/2010
WO  2008054397 A1  5/2008

*Primary Examiner* — Roberta S Delisle
(74) *Attorney, Agent, or Firm* — HAUPTMAN HAM, LLP

(57) ABSTRACT

A fastening method for fastening using a fastener having a fastener pin and a collar. The method includes a mounting step in which, in a state in which a head portion of the fastener pin is positioned on one side of the portion to be fastened through which the fastener pin is passed, and a lock portion of the fastener pin is positioned on the other side of the portion to be fastened, the collar is mounted onto lock grooves. The method includes a fastening step in which, on the basis of an un-swaged portion height derived from the thickness of the portion to be fastened, the collar is swaged onto the lock grooves and the portion to be fastened is fastened.

4 Claims, 3 Drawing Sheets

(56) References Cited

U.S. PATENT DOCUMENTS

| | | | | |
|---|---|---|---|---|
| 5,315,755 A * | 5/1994 | Fulbright | ............... | B21J 15/022 |
| | | | | 29/709 |
| 2009/0178262 A1 * | 7/2009 | Reid | ....................... | B23P 19/06 |
| | | | | 411/60.2 |
| 2012/0213610 A1 * | 8/2012 | Guerin | ...................... | F16B 5/02 |
| | | | | 411/378 |
| 2012/0260490 A1 * | 10/2012 | Sakoda | ............... | F16B 19/1045 |
| | | | | 411/34 |
| 2015/0078859 A1 * | 3/2015 | Haines, Jr. | .............. | F16B 19/05 |
| | | | | 411/361 |
| 2015/0252833 A1 * | 9/2015 | Brewer | .................. | B21J 15/022 |
| | | | | 411/361 |
| 2016/0053786 A1 * | 2/2016 | Haylock | ................. | F16B 19/05 |
| | | | | 451/38 |

\* cited by examiner

FASTENING METHOD AND FASTENING DEVICE

RELATED APPLICATIONS

The present application is a National Phase of International Application Number PCT/JP2020/001653 filed Jan. 20, 2020 and claims priority to Japanese Application Number 2019-031942 filed Feb. 25, 2019.

TECHNICAL FIELD

The present invention relates to a fastening method and a fastening device that fastens a part to be fastened using a fastener including a fastener pin and a collar.

BACKGROUND ART

In the related art, there is known a fastening system using a swage type fastener that fixes a plurality of workpieces to each other (for example, refer to PTL 1). The swage type fastener includes a pin member and a collar. The pin member includes a shank, and one end portion of the shank is a head. In addition, the shank includes a shank portion having a cylindrical shape, and a lock portion including a lock groove adjacent to the shank portion. The collar engages with the lock groove by swaging.

CITATION LIST

Patent Literature

[PTL 1] PCT Japanese Translation Patent Publication No. 2010-509547

SUMMARY OF INVENTION

Technical Problem

By the way, as the fastener including the fastener pin and the collar, a fastener corresponding to the thickness of the part to be fastened is used. Namely, the fastener pin has a specified length corresponding to the thickness of the part to be fastened. Meanwhile, since the thickness of the part to be fastened, which can correspond to the fastener, has a predetermined dimension, the thickness of the part to be fastened may be changed. In this case, the amount of protrusion of the fastener pin protruding from the part to be fastened is changed. When the amount of protrusion of the fastener pin protruding from the part to be fastened is large, the length from the part to be fastened to the boundary between the shank portion and the lock portion is also increased. In this case, when the collar is crimped to the lock portion of the fastener pin, an inner peripheral surface of the collar early interferes with the shank portion. When the inner peripheral surface of the collar interferes with the shank portion, the load of the fastening load increases. In addition, in a case where the amount of protrusion of the fastener pin differs, when the fastening load is made uniform by performing load control, there occurs a difference in amount of sink of the head of the fastener pin with respect to the part to be fastened, and there occurs a variation in smoothness between the surface of the part to be fastened and the surface of the head.

Therefore, an object of the present invention is to provide a fastening method and a fastening device capable of stably performing fastening with a fastener.

Solution to Problem

According to an aspect of the present invention, there is provided a fastening method for fastening a part to be fastened using a fastener including a fastener pin and a collar, the fastener pin including a head provided on one side in an axial direction, a shank portion provided on the other side in the axial direction with respect to the head, and a lock portion provided with a lock groove that is provided on the other side in the axial direction to be further away from the shank portion, the method including: a mounting step of mounting the collar to the lock groove in a state where the head of the fastener pin is located on one side of the part to be fastened through which the fastener pin is inserted, and the lock portion of the fastener pin is located on the other side of the part to be fastened; and a fastening step of crimping the collar to the lock groove of the lock portion to fasten the part to be fastened. A length of a portion of the collar in the axial direction, which is not crimped to the lock groove, is defined as an uncrimped portion height. In the fastening step, the collar is crimped to the lock groove of the lock portion based on the uncrimped portion height which is set. When the uncrimped portion height to be set is $H2$, a central value of a thickness of the part to be fastened, which corresponds to the fastener pin, is $T1$, a measured value of the thickness of the part to be fastened is $T2$, and an optimal value of the uncrimped portion height for the central value $T1$ is $H1$, the uncrimped portion height $H2$ to be set is derived based on a calculation equation of "$H2 = T1 - T2 + H1$".

According to another aspect of the present invention, there is provided a fastening device that fastens a part to be fastened using a fastener including a fastener pin and a collar. The fastener pin includes a head provided on one side in an axial direction, a shank portion provided on the other side in the axial direction with respect to the head, and a lock portion provided with a lock groove that is provided on the other side in the axial direction to be further away from the shank portion. In a state where the head of the fastener pin is located on one side of the part to be fastened through which the fastener pin is inserted, and the lock portion of the fastener pin is located on the other side of the part to be fastened, the collar is mounted to the lock groove, and the collar is crimped to the lock groove of the lock portion, so that the part to be fastened is fastened. A length of a portion of the collar in the axial direction, which is not crimped to the lock groove, is defined as an uncrimped portion height. The device includes a measurement unit that measures a thickness of the part to be fastened; and a control unit that sets the uncrimped portion height based on a measured value of the thickness of the part to be fastened, and causes the collar to be crimped to the lock groove of the lock portion based on the uncrimped portion height which is set. When the uncrimped portion height to be set is $H2$, a central value of the thickness of the part to be fastened, which corresponds to the fastener pin, is $T1$, the measured value of the thickness of the part to be fastened is $T2$, and an optimal value of the uncrimped portion height for the central value $T1$ is $H1$, the control unit sets the uncrimped portion height $H2$ to be set based on the measured value $T2$ of the thickness of the part to be fastened from a calculation equation of "$H2 = T1 - T2 + H1$".

According to the configuration, even when the length from the part to be fastened to the boundary between the shank portion and the lock portion is changed due to a change in thickness of the part to be fastened, the uncrimped portion height can be set based on the calculation equation.

Then, since the fastener can fasten the part to be fastened based on the uncrimped portion height which is appropriately set according to the thickness of the part to be fastened, the overloading of the fastening load can be suppressed, and a variation in amount of sink of the head with respect to the part to be fastened can be suppressed. Therefore, fastening with the fastener can be stably performed.

In addition, it is preferable that the central value T1 of the thickness of the part to be fastened is an average value of a maximum thickness and a minimum thickness of the part to be fastened, which corresponds to the fastener pin.

According to the configuration, the average value of the maximum thickness and the minimum thickness of the part to be fastened can be set to the central value T1 of the thickness of the part to be fastened. For this reason, a difference between the actually measured thickness of the part to be fastened and the average value of the maximum and minimum thicknesses of the part to be fastened can be derived by subtracting the measured value T2 of the thickness of the part to be fastened from the central value T1.

In addition, it is preferable that the optimal value H1 of the uncrimped portion height is a value that is experimentally derived in advance.

According to the configuration, since the uncrimped portion height which is optimal for the part to be fastened having a thickness of the central value T1 is experimentally derived in advance, the part to be fastened having a thickness of the central value T1 can be optimally fastened with the fastener.

DESCRIPTION OF EMBODIMENTS

Figure 1:
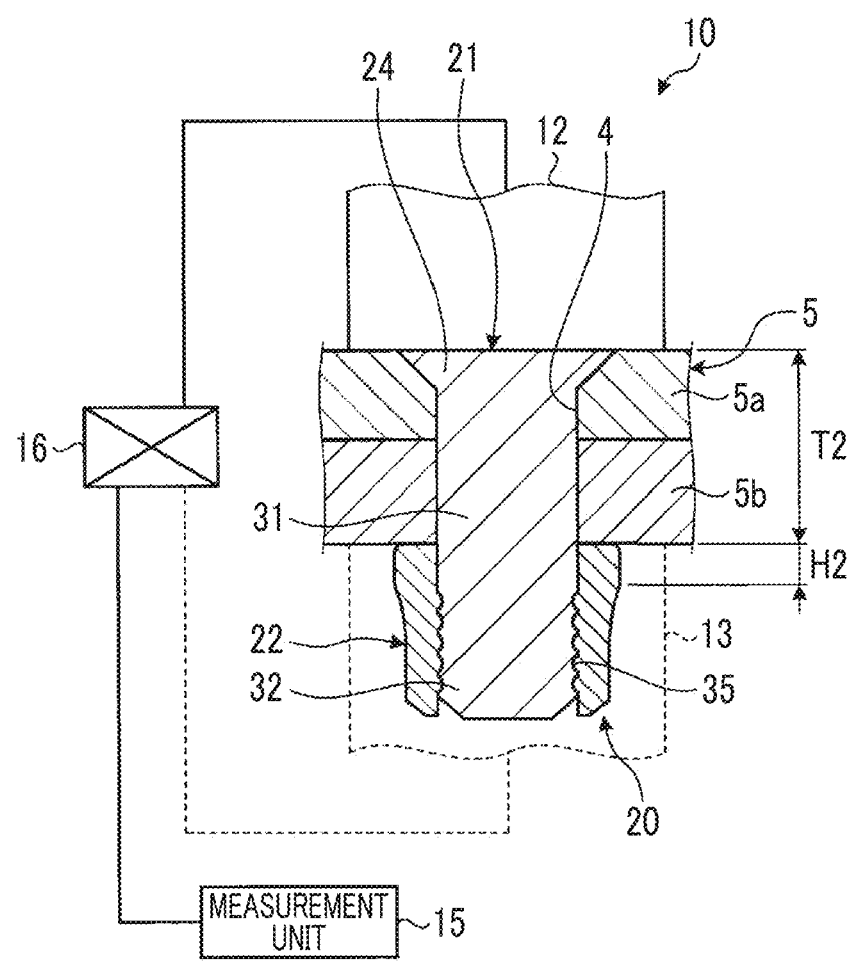
FIG. 1 is a descriptive view schematically illustrating a fastening device around a part to be fastened according to a first embodiment.

Hereinafter, an embodiment according to the present invention will be described in detail with reference to the drawings. Incidentally, the invention is not limited by the embodiment. In addition, the components in the following embodiment include components that can be easily replaced by those skilled in the art, or components that are substantially the same. Further, the components to be described below can be appropriately combined, and when a plurality of embodiments are implemented, the embodiments can be combined.

First Embodiment

A fastening device 10 according to a first embodiment is a device that fastens a part 5 to be fastened using a fastener 20. The fastening device 10 is referred to as, for example, an automatic drilling and fastening device (automatic riveter) that drills a hole in the part 5 to be fastened to form a fastening hole 4, and fastens the part 5 to be fastened with the fastener 20 using the fastening hole 4. A two-piece fastener including a fastener pin 21 and a collar 22 is used as the fastener 20. In addition, the part 5 to be fastened is formed of a pair of plate members 5a and 5b overlapping each other. First, the fastener 20 to be fastened to the pair of plate members 5a and 5b by the fastening device 10 will be described with reference to FIG. 1.

As illustrated in FIG. 1, the fastener 20 includes the fastener pin 21 extending in an axial direction, and the collar 22 to be crimped to the fastener pin 21. The fastener pin 21 includes a head 24 provided on one side in the axial direction, a shank portion 31 which is a portion on the other side (tip side) in the axial direction with respect to the head 24, and a lock portion 32 which is a portion on the other side in the axial direction with respect to the shank portion 31, and in which a lock groove 35 is formed. The head 24 is a countersunk head having a conical seat surface. Fastening is performed such that an upper surface of the head 24 is located slightly higher than the surface of the part 5 to be fastened. An outer peripheral surface of the shank portion 31 is a columnar surface. The lock groove 35 is formed in a peripheral surface of the lock portion 32. The collar 22 is crimped to the lock groove 35.

The fastener pin 21 is inserted through the fastening hole 4 formed to penetrate through the pair of plate members 5a and 5b in a stacking direction. When fastening is performed, the fastener pin 21 inserted through the fastening hole 4 has the head 24 located on a plate member 5a side which is one side (upper side in FIG. 1), and the lock portion 32 located on a plate member 5b side which is the other side (lower side in FIG. 1), with the pair of plate members 5a and 5b interposed between the head 24 and the lock portion 32. Then, a part on a base end side (head 24 side) of the shank portion 31 of the fastener pin 21 is located in the fastening hole 4, and a part on a tip side thereof is exposed from the plate member 5b on the other side (lower side in FIG. 1).

The collar 22 has a cylindrical shape, and is inserted from a lock portion 32 side of the fastener pin 21 to be mounted to the lock portion 32. The collar 22 mounted to the lock portion 32 is crimped by the fastening device 10.

Next, the fastening device 10 will be briefly described. The fastening device 10 includes a receiving part 12 provided on the head 24 side of the fastener pin 21 with respect to the part 5 to be fastened, and a fastening part 13 provided on a side opposite to the receiving part 12 with the part 5 to be fastened interposed therebetween. The fastening device 10 presses the fastener pin 21 mounted in the fastening hole 4 of the part 5 to be fastened, specifically, the head 24 of the fastener pin 21 using the receiving part 12. In addition, the fastening device 10 crimps the collar 22 mounted to the lock portion 32 using the fastening part 13 in a state where the head 24 of the fastener pin 21 is pressed by the receiving part 12.

In addition, the fastening device 10 includes a clamp receiving part (also referred to as upper pressure foot bushing) that is not illustrated and provided on an outer side of the receiving part 12; a clamping force applying part (also referred to as a lower pressure foot bushing) that is not illustrated and provided on an outer side of the fastening part 13; a measurement unit 15 that measures the thickness of the part 5 to be fastened; and a control unit 16 that controls each part. The measurement unit 15 measures the thickness of the part 5 to be fastened in a state where the pair of plate members 5a and 5b are brought into close contact with each other by the clamp receiving part and the clamping force applying part, and outputs the measured thickness of the part 5 to be fastened to the control unit 16 as a measured value T2. The control unit 16 controls the fastening part 13 based on the measured value T2, to fasten the fastener 20 to the part 5 to be fastened. Specifically, the control unit 16 causes the collar 22 to be crimped to the fastener pin 21 based on an uncrimped portion height H2 derived from the measured value T2, so that the fastener 20 is fastened to the part 5 to be fastened based.

Here, the length of the fastener pin 21 in the axial direction is a specified length according to the thickness of the part 5 to be fastened which is to be fastened. For this reason, when the thickness of the part 5 to be fastened is changed, the length from the part 5 to be fastened to the boundary between the shank portion 31 and the lock portion 32 in the axial direction of the fastener pin 21 is changed. The boundary is between a portion in which the lock groove 35 is formed and a portion in which the lock groove 35 is not formed in the fastener pin 21.

Figure 2:
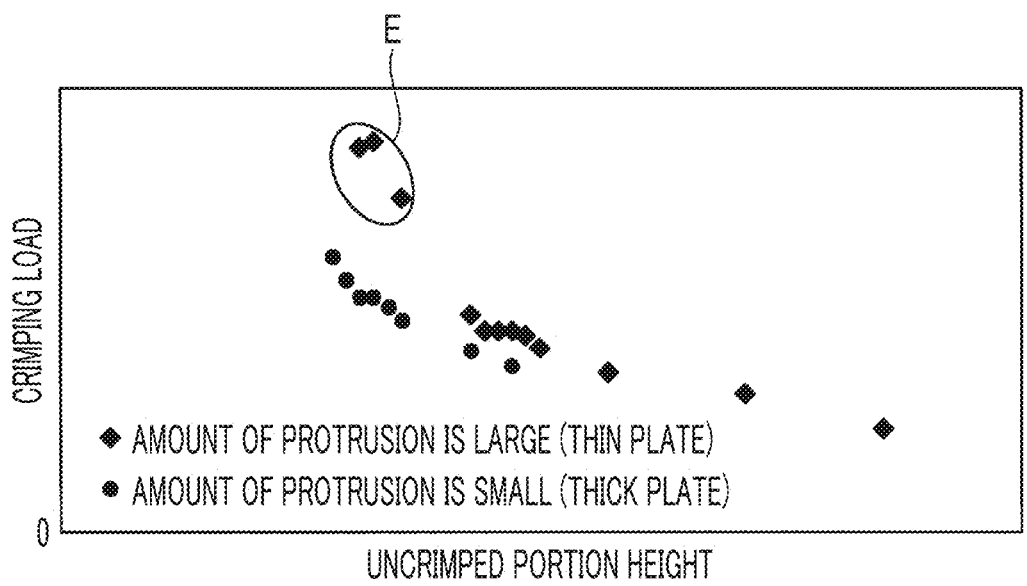
FIG. 2 is a graph relating to the crimping load of a fastening device in the related art.
Figure 3:
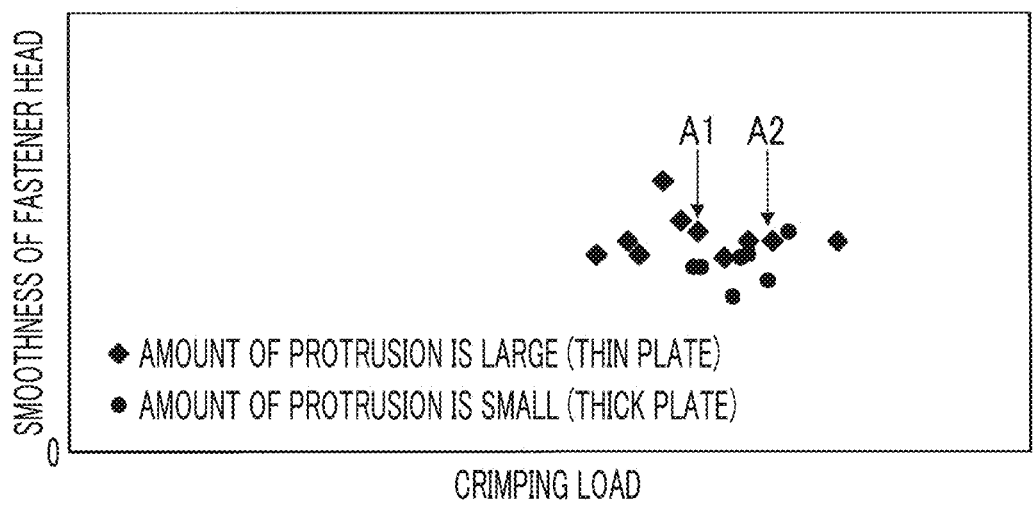
FIG. 3 is a graph relating to the smoothness of a fastener head of the fastening device in the related art.

In the related art, as described above, the fastening device 10 crimps the collar 22 to the fastener pin 21 based on the uncrimped portion height H2. The uncrimped portion height H2 is the length of a portion of the collar 22 in the axial direction, which is not crimped to the lock groove 35. Even when the length from the part 5 to be fastened to the boundary between the shank portion 31 and the lock portion 32 is changed, the fastening device 10 fastens the part 5 to be fastened using the fastener 20, based on the uncrimped portion height H2 that is a fixed value set in advance. At this time, the crimping load (fastening load) of the fastening device 10 is as in the graph illustrated in FIG. 2, and the smoothness of the upper surface of the head 24 with respect to the surface of the part 5 to be fastened is as in the graph illustrated in FIG. 3. FIG. 2 is a graph relating to the crimping load of a fastening device in the related art. FIG. 3 is a graph relating to the smoothness of the fastener head of the fastening device in the related art.

In FIG. 2, the horizontal axis of the graph is the uncrimped portion height H2, and the vertical axis thereof is the crimping load. In addition, black circles (●) in FIG. 2 indicate a change in crimping load when the amount of protrusion of the fastener pin 21 protruding from the part 5 to be fastened is small, namely, when the thickness of the part 5 to be fastened is thick. Meanwhile, black squares (◆) in FIG. 2 indicate a change in crimping load when the amount of protrusion of the fastener pin 21 protruding from the part 5 to be fastened is large, namely, when the thickness of the part 5 to be fastened is thin.

Looking at the black circles (●) in FIG. 2, when the amount of protrusion of the fastener pin 21 is small, the crimping load increases linearly as the uncrimped portion height decreases. Meanwhile, looking at the black squares (◆) in FIG. 2, the crimping load increases non-linearly as the uncrimped portion height decreases. Namely, when the length from the part 5 to be fastened to the boundary between the shank portion 31 and the lock portion 32 is shorter than a predetermined length, the crimping load increases rapidly in a region E.

In FIG. 3, the horizontal axis of the graph is the crimping load, and the vertical axis thereof is the smoothness of the upper surface of the head 24. Similar to FIG. 2, black circles (●) in FIG. 3 indicate a change in smoothness when the amount of protrusion of the fastener pin 21 protruding from the part 5 to be fastened is small, namely, when the thickness of the part 5 to be fastened is thick. Meanwhile, similar to FIG. 2, black squares (◆) in FIG. 3 indicate a change in smoothness when the amount of protrusion of the fastener pin 21 protruding from the part 5 to be fastened is large, namely, when the thickness of the part 5 to be fastened is thin.

Looking at FIG. 3, when the crimping loads in the case of the black circles (●) and the case of the black squares (◆) in FIG. 3 (for example, the crimping loads of A1 or A2) has the same value, the smoothness of the upper surface of the head 24 has different values. Namely, it can be seen that when the amounts of protrusion of the fastener pin 21 are different from each other, there occurs a difference in smoothness of the upper surface of the head 24.

In order to reduce an increase in crimping load as illustrated in FIG. 2 and a variation in smoothness as illustrated in FIG. 3, in the fastening device 10 according to the first embodiment, the fastener 20 fastens the part 5 to be fastened based on the uncrimped portion height H2 derived from a predetermined calculation equation. As described above, the uncrimped portion height to be set is H2. In addition, the central value of the thickness of the part 5 to be fastened, which corresponds to the fastener pin 21 is T1. As described above, the measured value of the thickness of the part to be fastened is T2. In addition, the optimal value of the uncrimped portion height for the central value T1 is H1. Here, the central value T1 of the thickness of the part 5 to be fastened is an average of the maximum thickness and the minimum thickness of the part 5 to be fastened, which corresponds to the fastener pin 21. Namely, the central value T1 of the thickness of the part 5 to be fastened is a value obtained by adding the maximum thickness and the minimum thickness of the part 5 to be fastened and dividing the sum by 2. In addition, the optimal value H1 of the uncrimped portion height is a value that is experimentally derived in advance. Namely, when the fastener 20 is used to fasten the part 5 to be fastened having a thickness of the central value T1, the uncrimped portion height at which the part 5 to be fastened can be stably fastened is experimentally derived as the optimal value H1. Then, the uncrimped portion height H2 to be set is derived based on a calculation equation of "$H2=T1-T2+H1$".

Namely, when the control unit 16 acquires the measured value T2 of the thickness of the part 5 to be fastened measured by the measurement unit 15, since the central value T1 of the thickness of the part 5 to be fastened and the optimal value H1 of the uncrimped portion height are already known, the control unit 16 derives the uncrimped portion height H2 based on the predetermined calculation equation. Then, the control unit 16 causes the fastener 20 to execute the fastening of the part 5 to be fastened based on the uncrimped portion height H2 that has been derived.

Figure 4:
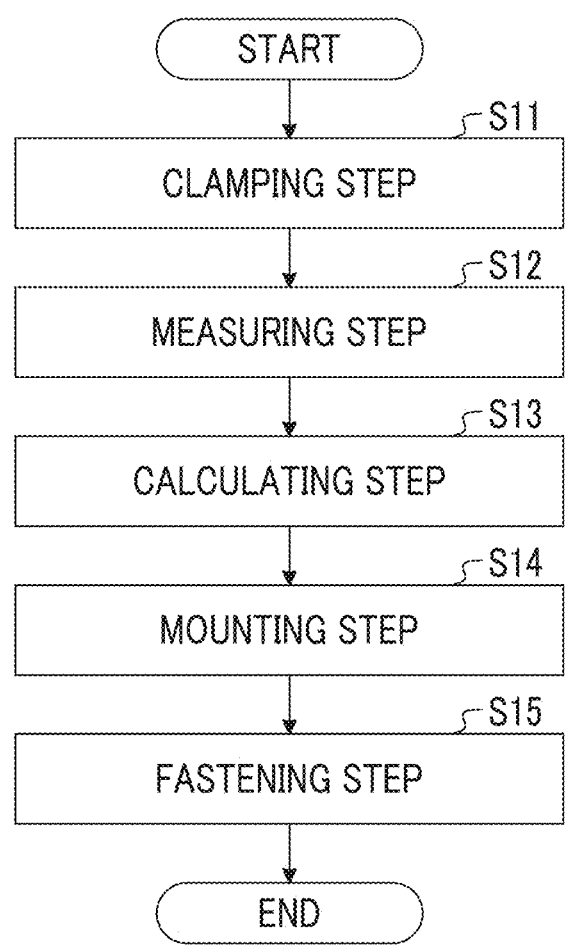
FIG. 4 is a flowchart relating to a fastening operation of the fastening device according to the first embodiment.

Next, a fastening operation using the fastener 20 by the fastening device 10 will be described with reference to FIG. 4. The fastening device 10 applies a clamping load to the pair of plate members 5a and 5b using the clamp receiving part and the clamping force applying part, to bring the pair of plate members 5a and 5b into close contact with each other and to fix the pair of plate members 5a and 5b to each other (step S11: clamping step). Thereafter, the fastening device 10 measures the thickness of the part 5 to be fastened using the measurement unit 15, to acquire the measured value T2 (step S12: measuring step). The fastening device 10 derives the uncrimped portion height H2 from the measured value T2 which is acquired, based on the predetermined calculation equation (step S13: calculating step). Then, the fastening device 10 forms the fastening hole 4 in the pair of plate members 5a and 5b, and inserts the fastener pin 21 through the fastening hole 4. The fastening device 10 mounts the collar 22 to the lock groove 35 from the lock portion 32 side of the fastener pin 21 (step S14: mounting step). In addition, then, the fastening device 10 crimps the collar 22 to the lock groove 35 based on the uncrimped portion height H2 which has been derived, to fasten the part 5 to be fastened (step S15: fastening step).

As described above, according to the first embodiment, even when the thickness of the part 5 to be fastened is changed, the uncrimped portion height H2 can be set based on the calculation equation. Accordingly, the fastener 20 can fasten the part 5 to be fastened based on the uncrimped portion height H2 which is appropriately set according to the thickness of the part 5 to be fastened. For this reason, the overloading of the crimping load can be suppressed, and a variation in amount of sink of the head 24 with respect to the part 5 to be fastened can be suppressed. Therefore, the part 5 to be fastened can be stably fastened with the fastener 20.

In addition, according to the first embodiment, the average value of the maximum thickness and the minimum thickness of the part 5 to be fastened can be set to the central value T1 of the thickness of the part 5 to be fastened. For this reason, the amount of a shift which is a difference between the actually measured thickness of the part 5 to be fastened and the average value of the maximum and minimum thicknesses of the part 5 to be fastened can be derived by subtracting the measured value T2 of the thickness of the part 5 to be fastened from the central value T1.

In addition, according to the first embodiment, since the uncrimped portion height H1 which is optimal for the part 5 to be fastened having a thickness of the central value T1 is experimentally derived in advance, the part to be fastened having a thickness of the central value T1 can be optimally fastened with the fastener 20.

REFERENCE SIGNS LIST

4: Fastening hole
5: Part to be fastened
5a, 5b: Plate member
10: Fastening device
12: Receiving part
13: Fastening part
15: Measurement unit
16: Control unit
20: Fastener
21: Fastener pin
22: Collar
24: Head
31: Shank portion
32: Lock portion
35: Lock groove

The invention claimed is:

1. A fastening device that fastens a part to be fastened using a fastener including a fastener pin and a collar,
in which the fastener pin includes a head provided on one side in an axial direction, a shank portion provided on the other side in the axial direction with respect to the head, and a lock portion provided with a lock groove that is provided on the other side in the axial direction to be further away from the shank portion,
in a state where the head of the fastener pin is located on one side of the part to be fastened through which the fastener pin is inserted, and the lock portion of the fastener pin is located on the other side of the part to be fastened, the collar is mounted to the lock groove, and the collar is crimped to the lock groove of the lock portion, so that the part to be fastened is fastened, and
a length of a portion of the collar in the axial direction, which is not crimped to the lock groove, is defined as an uncrimped portion height,
the device comprising:
a measurement unit that measures a thickness of the part to be fastened; and
a control unit that sets the uncrimped portion height based on a measured value of the thickness of the part to be fastened, and causes the collar to be crimped to the lock groove of the lock portion based on the uncrimped portion height which is set, and
wherein when the uncrimped portion height to be set is H2,
a central value of the thickness of the part to be fastened, which corresponds to the fastener pin is T1,
the measured value of the thickness of the part to be fastened is T2, and
an optimal value of the uncrimped portion height for the central value T1 is H1,
the control unit sets the uncrimped portion height H2 to be set based on the measured value T2 of the thickness of the part to be fastened from a calculation equation of "H2=T1−T2+H1".

2. A fastening method for fastening a part to be fastened using a fastener including a fastener pin and a collar,
the fastener pin including a head provided on one side in an axial direction, a shank portion provided on the other side in the axial direction with respect to the head, and a lock portion provided with a lock groove that is provided on the other side in the axial direction to be further away from the shank portion,
the method comprising:
a mounting step of mounting the collar to the lock groove in a state where the head of the fastener pin is located on one side of the part to be fastened through which the fastener pin is inserted, and the lock portion of the fastener pin is located on the other side of the part to be fastened; and
a fastening step of crimping the collar to the lock groove of the lock portion to fasten the part to be fastened,
wherein a length of a portion of the collar in the axial direction, which is not crimped to the lock groove, is defined as an uncrimped portion height,
in the fastening step, the collar is crimped to the lock groove of the lock portion based on the uncrimped portion height which is set, and
when the uncrimped portion height to be set is H2,
a central value of a thickness of the part to be fastened, which corresponds to the fastener pin, is T1,
a measured value of the thickness of the part to be fastened is T2, and
an optimal value of the uncrimped portion height for the central value T1 is H1,
the uncrimped portion height H2 to be set is derived based on a calculation equation of "H2=T1−T2+H1".

3. The fastening method according to claim 2,
wherein the central value T1 of the thickness of the part to be fastened is an average value of a maximum thickness and a minimum thickness of the part to be fastened, which corresponds to the fastener pin.

4. The fastening method according to claim 3,
wherein the optimal value H1 of the uncrimped portion height is a value that is experimentally derived in advance.

* * * * *